United States Patent [19]
Godwin

[11] Patent Number: 5,181,981
[45] Date of Patent: Jan. 26, 1993

[54] METHOD OF EMBOSSING THERMOPLASTIC MATERIAL

[75] Inventor: James E. Godwin, Ethelsville, Ala.

[73] Assignee: GenCorp Inc., Fairlawn, Ohio

[21] Appl. No.: 559,118

[22] Filed: Jul. 29, 1990

[51] Int. Cl.$^5$ .................... B29C 59/02; B32B 31/16
[52] U.S. Cl. .................... 156/209; 156/322; 156/499; 156/553; 264/284
[58] Field of Search ............... 156/209, 553, 205, 322, 156/499; 264/284; 425/336; 226/3

[56] References Cited

U.S. PATENT DOCUMENTS

| | | | |
|---|---|---|---|
| 2,224,370 | 12/1940 | Wescott | 156/322 X |
| 2,674,299 | 4/1954 | Bruker | 156/473 |
| 2,776,451 | 1/1957 | Chavannes | 264/284 |
| 4,105,491 | 8/1978 | Haase et al. | 156/209 X |

Primary Examiner—Jeff H. Aftergut
Assistant Examiner—Michele K. Yoder

[57] ABSTRACT

An embossing apparatus is disclosed as having a unique, perforated stainless steel platen which is fixedly disposed vertically above a nip which is formed between an embossing roll and a backup roll, both of which are designed to rotate about horizontal axes. The platen is curved so as to slidably support a sheet of thermoplastic material, as it moves from a generally horizontal position on the platen to a vertical position as it exits the platen downwardly into the nip. Means are provided above and below the platen for heating the platen and helping heat the sheet of thermoplastic material as it travels along the fixed platen.

5 Claims, 1 Drawing Sheet

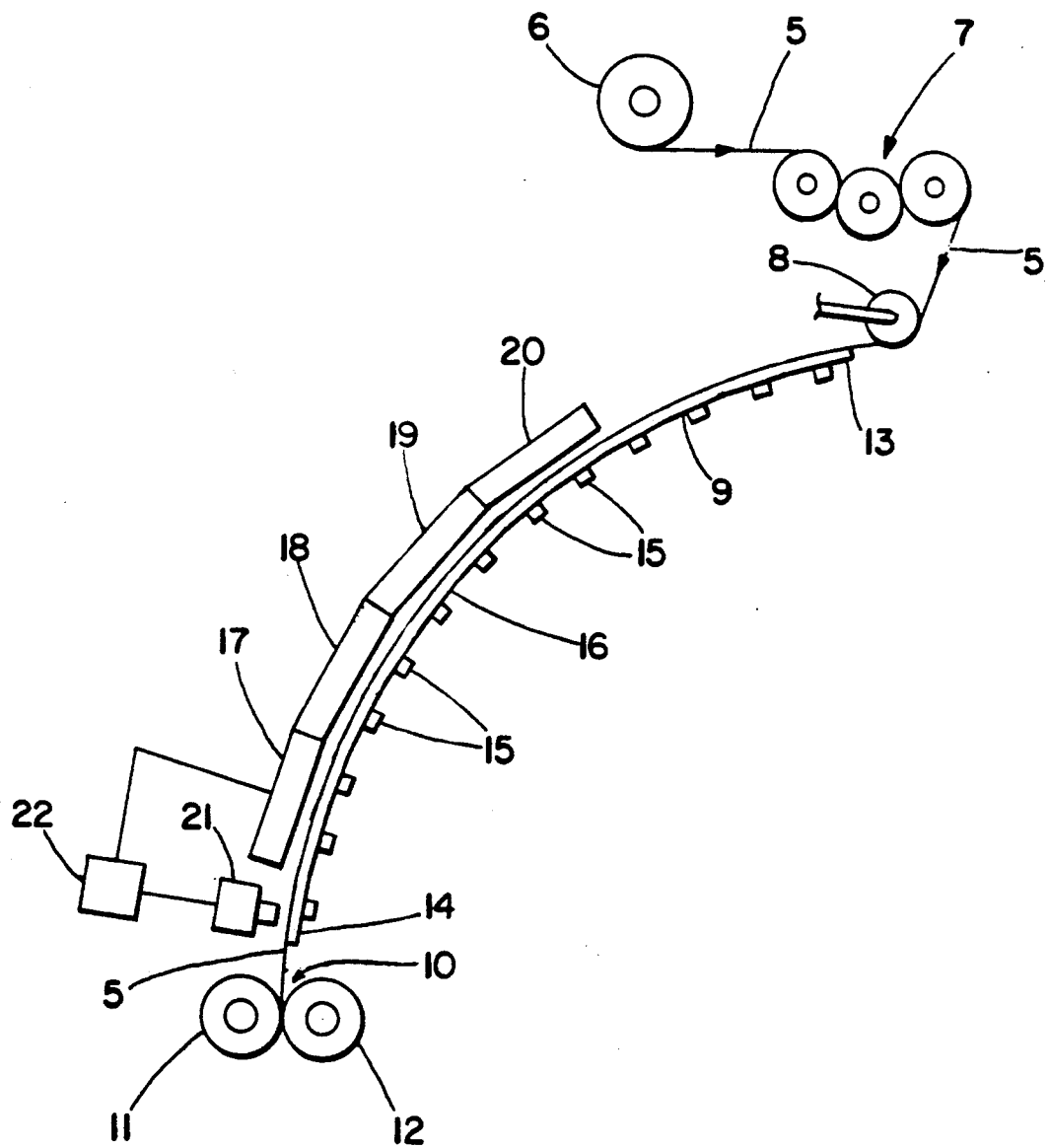

METHOD OF EMBOSSING THERMOPLASTIC MATERIAL

BACKGROUND OF THE INVENTION

The invention relates to embossing, especially to a device used to preheat a thermoplastic embossable material, prior to contact with an embossing roll.

It is well known in the art to pass such material from a heat drum downwardly between a pair of radiant heaters into a nip formed between an embossing roll and a backup or bed roll. It has been found that air or gaseous vapors form under the sheet of material next to the surface of the heat drum, as the material is heated. The accumulation of such vapor forms under the sheet, bubbles which interfere with the uniform heating of the material by the heat drum and radiant heaters causing lower embossing depths which are referred to as embossing streaks.

Moreover, once a vinyl-type product is heated to the yield point for embossing, any variation in tension in the sheet can cause distortion of the material. This distortion is particularly bad in geometric patterns that have to have straight lines and configurations. Heat drums have to be large enough to provide necessary dwell time for proper heat transfer to the material. However, use of a larger drum results in more problems of inertia and speed control. Minute speed variations can alter the tension to cause distortion of the material.

Then too, the temperature of a heat drum can vary from end-to-end to cause a temperature differential in the material which, in turn, causes a variation in the embossment of the material resulting in an unacceptable appearance and feel of the finished product.

U.S. Pat. No. 3,950,480 relates to a method of embossing plastic material without the use of a heat drum. Instead, a pair of hot air heaters 14, 15 are used to direct streams of hot air against opposing sides of the material, as the sole method of heating the material for embossing. For some materials, it can be imagined that the heating zone between the heaters would have to be quite lengthy to properly heat the material. Also, the streams of hot air would have to be carefully controlled, so as not to adversely distort the material as it is struck by the streams of air.

U.S. Pat. No. 4,556,378 relates to a pair of adjacently disposed rotatable discs 2, 3, the first disc 2 to be encountered by the material, carrying a circumferential band which is used to preheat the material, prior to contacting the second, molding disc 3. It can be imagined that the rotational speeds of the two discs must be carefully controlled to prevent distortion of the material.

U.S. Pat. No. 2,776,451 relates to an embossing system which utilizes a heated, perforated metal conveyor for supporting and heating the material as it is transported to the nip between the embossing roll 43 and backup roll 42. Again, the speed of the conveyor must be carefully synchronized with the rotation of the embossing roll to prevent distortion of the material.

The invention is directed to the provision of an embossing apparatus in which many of the aforementioned problems are eliminated or substantially reduced.

Briefly stated, the invention is in an apparatus and related process for embossing a heated thermoplastic material, such as a scrim or paper backed vinyl. The apparatus comprises a perforated, fixed metal platen which is curved downwardly towards the nip formed between the embossing roll and backup roll, such that the material will be slidably supported on the platen. Means are provided for simultaneously heating the platen and the outer surface of the material farther spaced from the platen than the underside or backing of the material contacting the platen. The scrim or paper backing of the vinyl must not be exposed to the high temperatures to which the vinyl is exposed, because of the instability of such backing or substrate.

DESCRIPTION OF DRAWING

The following description of the invention will be better understood by having reference to the accompanying drawing which is a schematic drawing of an embossing apparatus and system which is made in accordance with the invention.

DETAILED DESCRIPTION OF DRAWING

A sheet 5 of any suitable fabric, or paper backed thermoplastic material is drawn from a let off or supply roll 6 by an assembly of drive rolls 7 and passed around a tensioning roll 8 for sliding support on an adjacent, fixed platen 9 which is designed to direct the thermoplastic sheet 5 into the nip 10 formed between an embossing roll 11 and a backup or bed roll 12 for embossment and subsequent cooling.

The fixed platen 9 is composed of stainless steel and is sized to accomodate the width of the thermoplastic sheet and the length of travel of the sheet 5 necessary to properly heat the sheet 5 for embossment. The platen 9 is perforated in accordance with the need to allow the escapement of air or gaseous vapors which are generated during the heating of the sheet 5. The perforations are open to the atmosphere to allow for the free escape of vapor to prevent distortion of the thermoplastic sheet. The platen 9 is arcuately curved downwardly, such that the inlet end 13 of the platen 9 is angularly disposed slightly downwardly from the horizontal, and the discharge end 14 of the platen 9 is almost vertical, so as to direct the sheet 5 downwardly into the nip 10 between the embossing roll 11 and the backup roll 12 which is driven to pull the sheet 5 from the platen 9 into the nip 10 between the rolls 11, 12.

A number of similar strip heaters 15 are secured crosswise to the underside 16 of the platen 9 to heat the platen 9 which, in turn, heats the thermoplastic sheet 5. A plurality of infrared heaters 17–20 are disposed in vertically spaced relation above the platen 9 to heat the thermoplastic sheet from above, as it passes between the infrared heaters 17–20 and platen 9. Any suitable infrared heat sensor 21 can be positioned adjacent the discharge end 14 of the platen 9 to monitor the temperature of the sheet 5 and send signals to a panel box 22 which automatically controls operation of the infrared heaters 17–20. The heating can be manually controlled rather than automatically controlled, if desired.

Thus, there has been described an embossing apparatus that utilizes a unique perforated stainless steel platen which allows the gaseous products, generated during the heating cycle, to escape, thereby preventing distortion of the thermoplastic material. The relative motion between the platen and material as the material moves across the fixed platen, helps the gaseous products to escape. The shape, position, and slick outer surface of the platen allows the material to move across it with little or no resistance. The platen provides support for the heated material to prevent distortion of the material under its own weight, and is designed to feed the material into the mouth of the nip between the embossing and backup rolls. It can be said that the platen causes the material to move in a downhill direction toward the embossing roll, contrary to U.S. Pat. No. 2,776,451 which teaches moving the material in an uphill direction, prior to moving it downhill.

The heated platen arrangement is particularly well suited for vinyl-type products that lose stability and strength when heated in the embossing process. The vinyl-type products can be heated on the platen to a yielding point for embossment and supported into the nip between the embossing and backup rolls. In this way, tension can be reduced to a minimum to prevent distortion. This is especially true on wallcoverings of vinyl construction.

What is claimed is:

1. A method of embossing a thermoplastic material in a nip which is formed between an embossing roll and a back-up roll, both of which rolls rotate about parallel, horizontal axes, comprising the steps of:

preheating a strip of thermoplastic sheet material by passing the strip in contact, sliding supported relation over a fixed surface of a heated metal platen having a plurality of perforations which are open to the atmosphere to allow for the removal of vapor to prevent distortion of the strip of thermoplastic material, the surface extending upwardly from the nip and curving arcuately above and to one side of the nip and designed to direct the strip downwardly into the nip; and embossing the strip of thermoplastic material by passing it between an embossing roll and a back-up roll.

2. The method of claim 1, wherein the platen is curved and positioned such that the material moves in a generally horizontal pathway as it initially encounters the platen.

3. The method of claim 2, wherein the material comprises a vinyl which is backed up by a substrate, and wherein the substrate is a material selected from the group consisting of scrim and paper.

4. The method of claim 1, wherein the surface of the platen is stainless steel, and the method includes simultaneously heating the vinyl material with a number of infrared heaters spaced above the surface and sheet passing over the surface while heating the substrate from below by the heated platen.

5. The method of claim 4, wherein the material comprises a vinyl which is backed by a substrate, and wherein the substrate is a material selected from the group consisting of scrim and paper.

* * * * *